United States Patent [19]

Freeman et al.

[11] 4,111,210

[45] Sep. 5, 1978

[54] TRASH-FREEING REAR CROSS-CONVEYOR FOR TOMATO HARVESTER

[75] Inventors: Daniel L. Freeman, Rio Vista; Darryl G. Bettencourt, Lodi; George E. Marshall, Jr., Sacramento, all of Calif.

[73] Assignee: The Regents of the University of California, Berkeley, Calif.

[21] Appl. No.: 754,128

[22] Filed: Dec. 27, 1976

[51] Int. Cl.² .......................................... A01D 45/00
[52] U.S. Cl. .................................. 130/30 R; 171/26; 56/327 R; 209/1
[58] Field of Search ................... 56/327 R; 130/30 R; 171/14, 26; 209/132–139 A, 147, 148

[56] References Cited

U.S. PATENT DOCUMENTS

| 3,455,448 | 7/1969 | Bettencourt | 209/134 |
| 3,469,691 | 9/1969 | Boyce | 209/133 |
| 3,656,488 | 4/1972 | Dumanowski et al. | 130/30 R |
| 3,986,561 | 10/1976 | Bettencourt et al. | 171/14 |

*Primary Examiner*—Russell R. Kinsey
*Attorney, Agent, or Firm*—Owen, Wickersham & Erickson

[57] ABSTRACT

An improved trash separation mechanism at the rear cross-conveyor assembly of a tomato harvester. A frame of the harvester supports a centrally located fruit collecting conveyor for delivering fruit rearwardly to the rear cross-conveyor assembly. A blower directs a strong rearward airstream from adjacently below the rear end of the collecting conveyor across the rear cross-conveyor assembly. A rearwardly rotating roller is mounted adjacently behind the cross-conveyor assembly and moves vegetative and mineral trash away from the cross-conveyor. A slide plate behind the roller may deflect the trash to the ground. A series of resilient fingers depending downwardly from above the roller move in circular vertical patterns to agitate the trash as it collects at the roller to prevent accumulation of the trash upon the roller and to enhance rearward movement thereof upon the roller and deposit of the trash on the ground.

11 Claims, 3 Drawing Figures

TRASH-FREEING REAR CROSS-CONVEYOR FOR TOMATO HARVESTER

BACKGROUND OF THE INVENTION

The present invention relates to an improved trash separation mechanism for mechanical harvesters such as tomato harvesters. More particularly, this invention relates to an improved trash separator mechanism for use with a rear cross-conveyor assembly of a tomato harvester and the like.

In harvesters such as tomato harvesters, the plants are severed at their roots, are picked up and elevated and carried to a separating device which separates the fruit from the stems and leaves, typically by oscillatory and vibratory action resulting in severance of the fruit from the vines. The separated fruit typically drops to a collecting conveyor below the separating device.

In certain harvesters, for example, the tomato harvester described in the assignee's U.S. Pat. No. 3,986,561, the collecting conveyor carries the fruit to the rear of the harvester and deposits it on a pair of rear cross-conveyors. These cross-conveyors, in turn, carry the fruit out to the sides and deposit the fruit onto forwardly moving conveyors leading to the sorting operation.

At the point where the collecting conveyor deposits the fruit onto the rear cross-conveyors, a forced-air blower system has been found to be desirable to blow the leaves and other light vegetative and mineral matter away from the heavier fruit. One such blower system is described in the assignee's U.S. Pat. No. 3,455,448. The nozzle of such a blower is generally disposed adjacently below the collecting conveyor and aimed to blow across the rear cross-conveyors.

A problem encountered with this type of trash separation device has been the unwanted accumulation of trash on the far side of the cross-conveyors, despite the provision of fixed deflection structures for guiding the trash from the cross-conveyors to the ground. Particularly offensive have been small vines and weeds that have become entangled in the rear cross-conveyor assembly and adjacent fixed frame structure and have thereupon collected other trash until the trash separation system at the rear cross-conveyor has lost its efficiency and in some extreme instances, even its utility.

The present invention solves this problem by providing a rearwardly rotating roller adjacently behind the rear cross-conveyors. The roller constantly rotates and urges trash thereon away from the cross-conveyors and to the ground. In addition, preferably a series of moving resilient fingers depend downwardly from a position above the roller. These fingers move just above the roller so as to engage and agitate the trash which might otherwise accumulate on the roller. The agitation produced thereby precludes a buildup of trash upon the roller and enables the roller to move the trash rearwardly away from the rear cross-conveyors to achieve an improved trash separation from the tomatoes.

Other objects, advantages and features of the invention will become apparent from the following detailed description of a preferred embodiment presented in conjunction with the accompanying drawings.

DETAILED DESCRIPTION OF A PREFERRED EMBODIMENT

Figure 1:
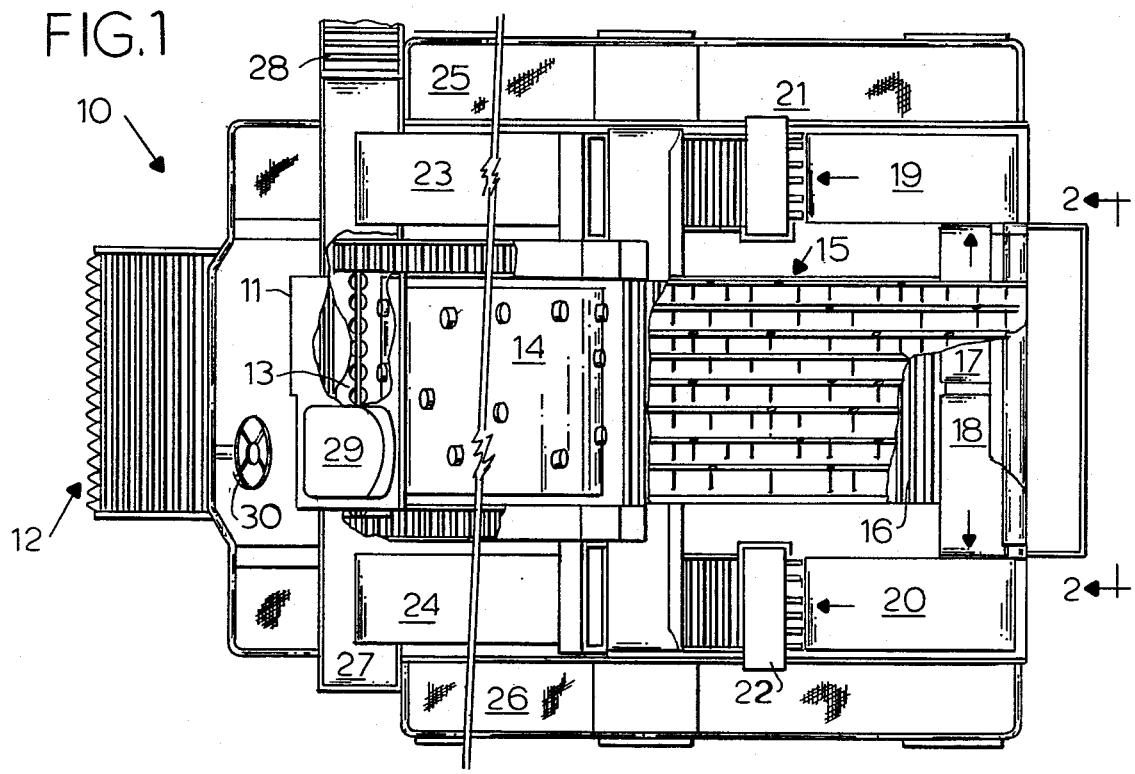
FIG. 1 is a top plan view of a tomato harvester incorporating the principles of the present invention.

A tomato harvester 10 embodying the principles of this invention is illustrated in FIG. 1, although, of course, other embodiments are possible. In the device shown in FIG. 1, there is a main frame 11 supported on wheels (not shown). The harvester 10 incorporates a powering mechanism, such as an internal combustion engine and a drive train powered thereby.

The main frame supports a front severance and pickup mechanism 12, a clod separator 13, and upper elevator 14, a shaker assembly 15, and a collection conveyor 16 under the shaker assembly 15.

At the rear of the harvester 10, just behind the collection conveyor 16 are two counter directionally moving horizontal rear cross-conveyors 17 and 18, each moving horizontally outwardly from the longitudinal centerline of the harvester 10 as shown by the arrows placed thereon, in FIG. 1.

Outwardly below and adjacent the rear cross-conveyors 17 and 18 are two forwardly moving presorting conveyors 19 and 20 which receive the tomatoes dumped from the cross-conveyors 17 and 18 and carry them forward to mechanized electromechanical sorting stations 21 and 22 being preferably of the type described in the assignee's co-pending U.S. Patent Application No. 733,157, filed on Oct. 18, 1976.

After the accepted tomatoes pass the mechanized sorting stations 21 and 22, they are carried forward on post-sorting conveyors 23 and 24, where workers may stand on platforms 25 and 26 to complete, if needed, a final inspection and manual sort to remove damaged and otherwise unacceptable fruit not rejected during mechanical sorting. The tomatoes then pass to a front cross-conveyor 27 and a loading elevator 28 which elevates and deposits them into an adjacent parallel moving receptacle, such as a bin on a flat bed truck.

The harvester 10 also includes a driver's seat 29 and steering wheel 30, and may include an awning to shield the workers from the sun's rays.

Figure 2:
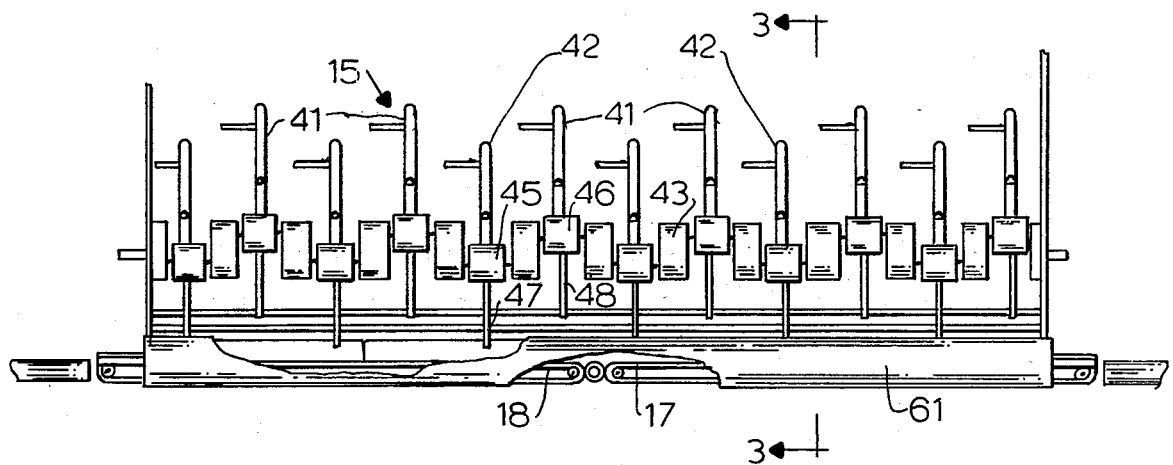
FIG. 2 is a partial end view in elevation and enlargement of the harvester of FIG. 1, along the line 2—2.
Figure 3:
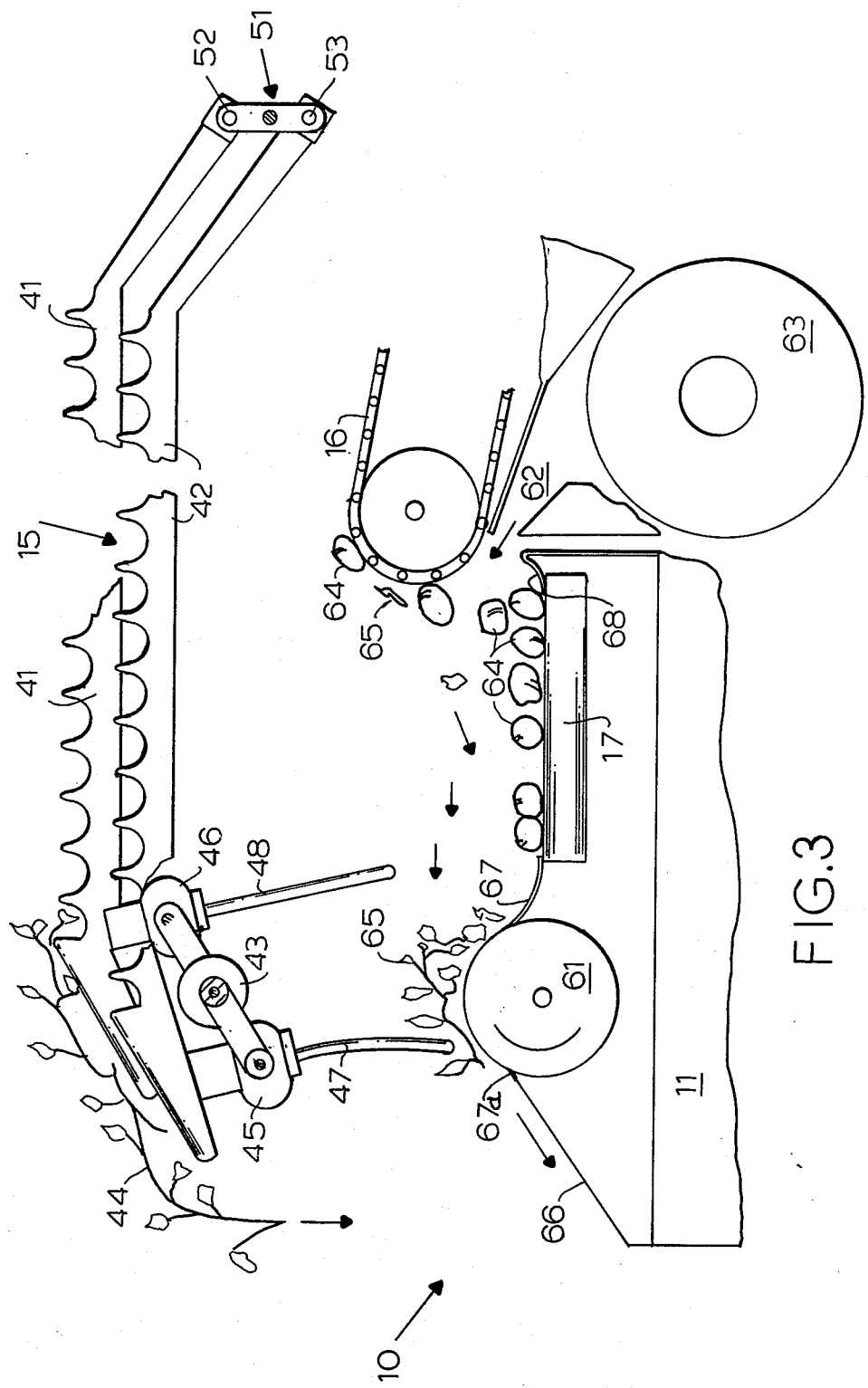
FIG. 3 is a partial view in side elevation of the harvester of FIG. 1 along the line 3—3 in FIG. 2.

The principles of the present invention are perhaps best illustrated by FIGS. 2 and 3 which depict details of the harvester 10 at the rear cross-conveyors 17 and 18. Referring to FIGS. 2 and 3, the shaker assembly 15 is seen to comprise a series of longitudinally extending walking bars, arranged in two sets, the bars in a first set denoted by the reference numeral 41 and those in the other set being denoted by numeral 42. Except for an improvement described hereinafter, the shaker assembly is similar to those shown in the assignee's U.S. Pat. Nos. 3,986,561, 3,455,453, 3,252,464 and 3,203,430.

The bars 41 and 42 are all journaled to a rear dual crank assembly 43 which rotates at a predetermined rate so that one set 41 of the bars moves upwardly and rearwardly while the other set moves forwardly in a downward position, (counterclockwise in FIG. 3). In this way, the vines and other vegetation from which the tomatoes have been separated move rearwardly to a point where they are dropped to the ground behind the harvester 10, as shown in FIG. 3 by the vine 44 falling off of the shaker assembly 15.

Each bar 41 and 42 is rotatably secured to the rear crank assembly 43 by a bushed journal 45 or 46 depending upon whether it is of the first set of bars 41 or the second set of bars 42. To the bottom of each journal 45 or 46 is mounted a resilient finger: there being two series of fingers, a first set of fingers 47 attached to the bottoms of the journals 45 and a second set of fingers 48 attached to the bottoms of the journals 46. The fingers 47 and 48 may be made of any suitable elastomeric material. A section of small diameter neoprene hose works well for each finger.

The two series 41 and 42 of walking bars are likewise journaled to a front dual crank assembly 51, so that bars 41 of the first series are bushed to crank pins 52 while bars 42 of the second series are bushed to crank pins 53. The front crank assembly 51 rotates in the same direction as the rear crank assembly 43 is synchronized therewith so that the desired rearward walking effect of the bars 41 and 42 is achieved in the well known manner.

Adjacently behind the rear cross-conveyors 17 and 18 is a rearwardly rotating roller 61 which is in general vertical alignment with the axis of rotation of the rear crank assembly 43 above it. The fingers 47 and 48 are made of sufficient length to approach closely, but not touch, the upper surface of the roller 61. It is to be understood that there is no substantial functional impairment resulting from occasional contact between a finger and the roller, and the placement of the fingers specified herein is preferred, but is in no sense limiting.

In practice it has been found that the movement of each of the lower ends of the fingers 47 define a seven-inch diameter circular locus in a vertical plane with a center six inches above and four and a half inches in front of the center of the roller 61, which also, preferably, has a seven-inch diameter.

As shown in FIG. 3, adjacent to but below the rear end of the collection conveyor 16 is a nozzle 62 of a blower 63 which may be of the squirrel cage type or may comprise axially rotating blade fans. The nozzle 62 is aligned to provide a substantial jet flow of air in a rearwardly direction, across the rear cross-conveyors 17 and 18. As tomatoes 64 and light vegetative and mineral trash 65 fall off the end of the collection conveyor 16, the airstream from the nozzle 62 blows the trash 65 rearwardly while the tomatoes 64 fall to the cross-conveyors 17 and 18.

The airstream (shown by arrows in space in FIG. 3) directs the trash to the roller 61, where it falls and tends to collect. However, the rearward rotational movement of the upper portion of the roller 61 in cooperation with the circular stirring movement of the fingers 47 and 48 prevents the trash from accumulating and assures that it falls to the ground behind the harvester 10.

A downwardly inclined metal slide plate 66 is secured to the frame 11 closely behind the roller 61 so that the trash moved rearwardly by the roller 61 is deflected and guided by the plate 66 to the ground behind the harvester. An edge 67a of the plate 66 provides a scraper which is adapted to scrape mud and all other accumulations and buildups off of the roller 61. Then heavier debris 65 such as vine twigs, rocks, etc. passing over the plate 66 carry the scraped mud and other matter to the ground.

A guide member 67 placed between the moving surfaces of the cross-conveyors 17 and 18 along one edge and the roller 61 along another edge parallel to the first, deflects trash from the cross-conveyors 17 and 18 onto the roller 67. The guide 61 is preferably constructed of a pliantly elastomeric material, such as soft neoprene rubber or rubber coated fabric. The inside edge of the cross-conveyors 17 and 18 may also be provided with a guide member 68. Together, the guide members 67 and 68 prevent the unwanted accumulation of trash, and tomatoes at the side edges of the conveyors 17 and 18.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. In a tomato harvester having a wheel-mounted frame supporting a centrally located fruit collecting conveyor for delivering fruit rearwardly to a rear cross-conveyor assembly having at least one transversely moving conveyor and a blower for directing a strong rearward airstream from adjacently below the rear end of the collecting conveyor across said conveyor for separation and disposal of vegetative and mineral trash, an improvement in said rear cross-conveyor assembly comprising the combination of:

a rearwardly rotating roller having an axis of rotation generally parallel to the direction of travel of said transverse conveyor and rotationally mounted on said frame adjacent to but behind said conveyor, a series of moving resilient fingers depending downwardly from above the roller for engaging and agitating said trash otherwise accumulating on said roller and for facilitating movement of said trash upon said roller and away from said rear cross-conveyor assembly, and slide means mounted adjacent to but behind said roller for removing said trash therefrom and directing it to the ground.

2. The improved cross conveyor assembly set forth in claim 1 further comprising resilient guide means placed between said transverse conveyor and said roller for guiding said trash from said conveyor onto said roller.

3. The improved cross-conveyor assembly set forth in claim 1 wherein said slide means includes scraper means closely adjacent said roller for scraping mud and other unwanted accumulations off of said roller.

4. A rear cross-conveyor assembly for a tomato harvester having a wheel-mounted frame supporting a pickup assembly, an elevator for picked up plants, a shaker for separating tomatoes from the plants, a centrally located fruit-collecting conveyor for delivering fruit rearwardly to said rear cross-conveyor assembly, the combination of a pair of transversely outwardly moving conveyors, each having a forward edge and a rear edge, blower means adjacent the forward edge of said conveyors and slightly thereabove for directing a strong rearward airstream from adjacently below the rear end of the collecting conveyor across said conveyor for separation and disposal of vegetative trash, and a rearwardly rotating roller extending along the rear edge of said conveyors, having a horizontal axis of rotation, parallel to said conveyor's rear edge.

5. The rear cross-conveyor assembly set forth in claim 4 further comprising resilient guide means placed between said transverse conveyors and said roller for guiding said trash from said conveyors onto said roller.

6. The rear cross-conveyor assembly of claim 4 having slide means mounted adjacent to but behind said roller for removing said trash therefrom and directing it to the ground.

7. The rear cross-conveyor assembly of claim 6 wherein said slide means includes scraper means closely adjacent said roller for scraping mud and other unwanted accumulations off said roller.

8. The rear cross-conveyor assembly of claim 4 having a series of resilient fingers supported above said roller and depending downwardly, and means for moving said fingers in a circular path, for engaging and agitating said trash otherwise accumulating on said roller and for facilitating movement of said trash upon said roller and away from said rear cross-conveyor assembly.

9. A tomato harvester, comprising:

a wheel mounted frame supporting a shaker assembly supported by said frame and having two alternating series of fore-and-aft extending walking bars mounted to two oppositely extending crank arms of a rotating crankshaft, fruit collecting conveyor means below said shaker assembly for delivering fruit rearwardly, a rear cross-conveyor assembly having a pair of oppositely moving transverse conveyors having front-and-rear edges, blower means close below the rear end of the collecting conveyor and just above said front edge, for directing a strong rearward airstream across said conveyors for separation and disposal of vegetative and mineral trash, a rearwardly rotating roller along said rear edge and having an axis of rotation generally parallel to the direction of travel of said transverse conveyor, two series of moving resilient fingers depending downwardly from said walking bars and accordingly in two sets with their lower ends at all times higher than the rollers and moved in circular paths by said bars, for engaging and agitating said trash otherwise accumulating on said roller and for facilitating movement of said trash upon said roller and away from said rear cross-conveyor assembly, and slide means mounted adjacent to but behind said roller for removing said trash therefrom and directing it to the ground.

10. The improved cross-conveyor assembly set forth in claim 9 further comprising resilient guide means placed between said transverse conveyor and said roller for guiding said trash from said conveyor onto said roller.

11. The improved cross-conveyor assembly set forth in claim 9 wherein said slide means includes scrapper means closely adjacent said roller for scrapping said roller free of mud and other unwanted accumulations.

* * * * *